United States Patent Office 2,861,926
Patented Nov. 25, 1958

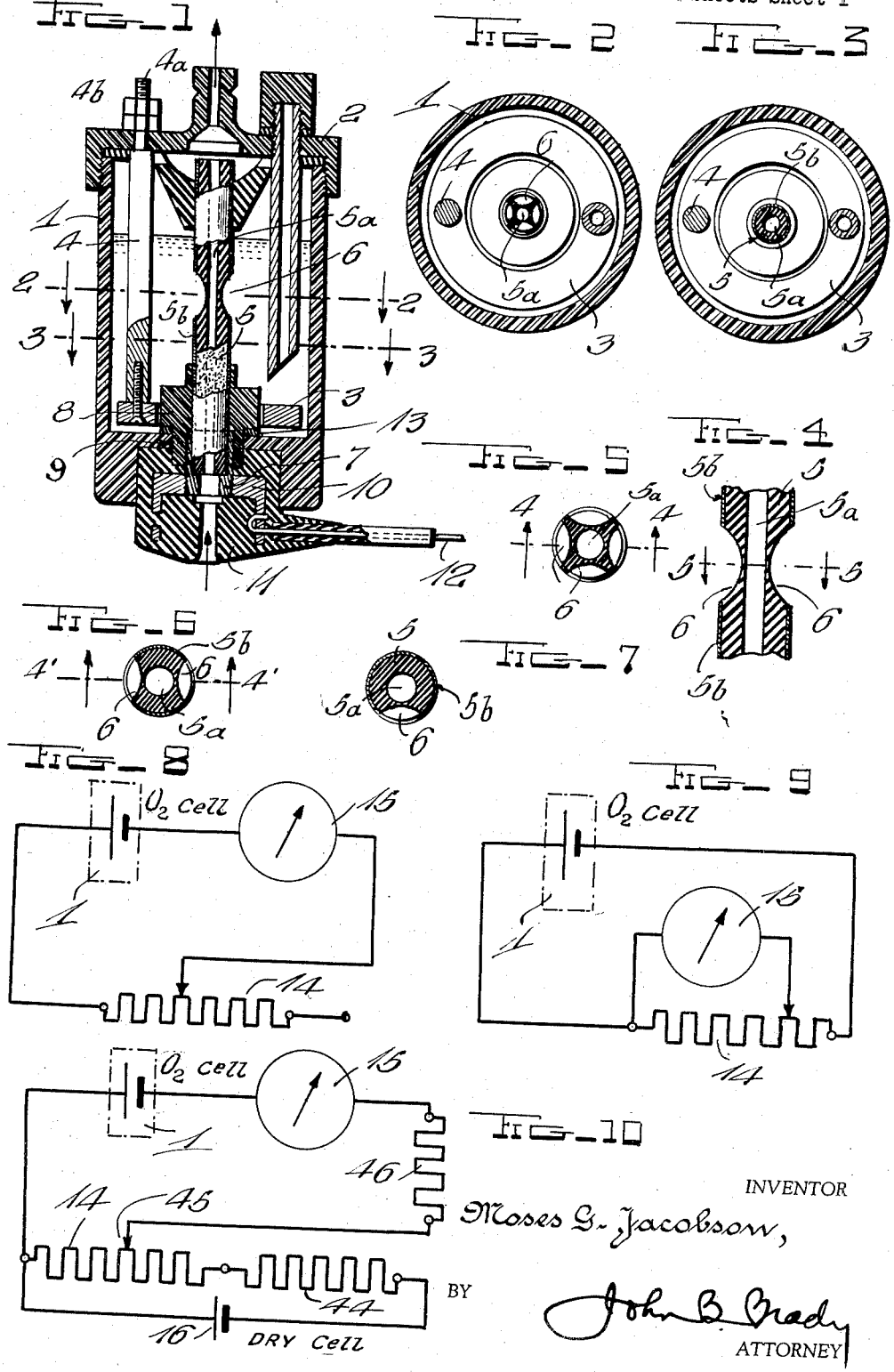
Nov. 25, 1958     M. G. JACOBSON     2,861,926
ELECTROCHEMICAL METHOD AND APPARATUS FOR GAS DETECTION
Filed Feb. 26, 1953     3 Sheets-Sheet 1
INVENTOR
Moses G. Jacobson,
BY John B. Brady
ATTORNEY Nov. 25, 1958  M. G. JACOBSON  2,861,926
ELECTROCHEMICAL METHOD AND APPARATUS FOR GAS DETECTION
Filed Feb. 26, 1953  3 Sheets-Sheet 2
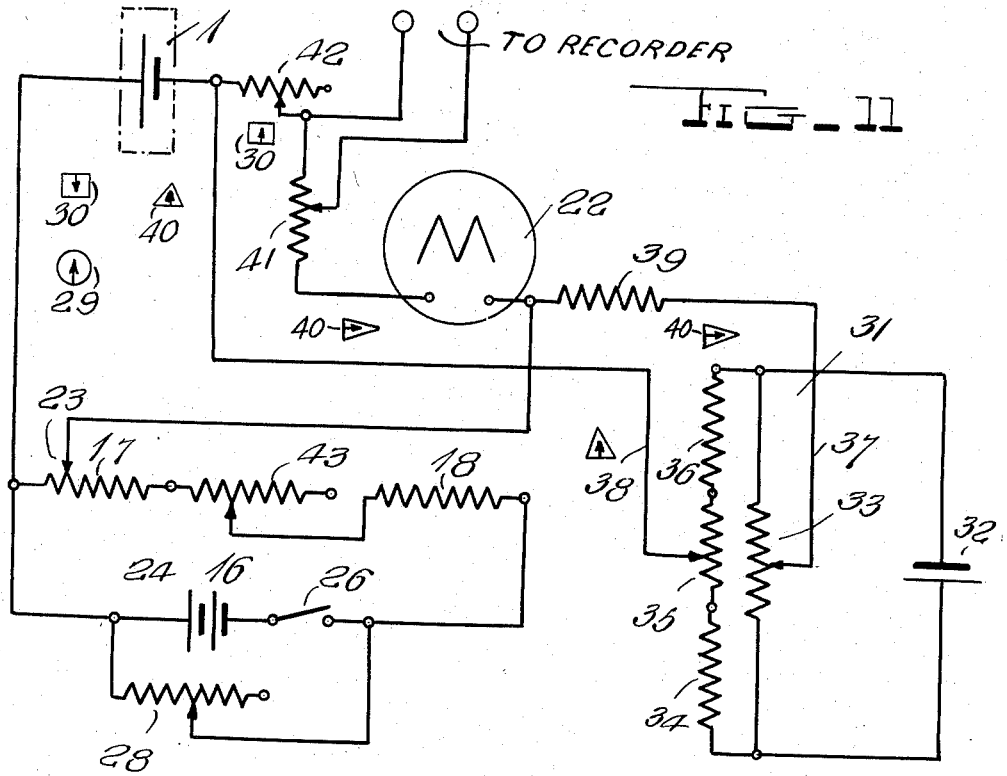
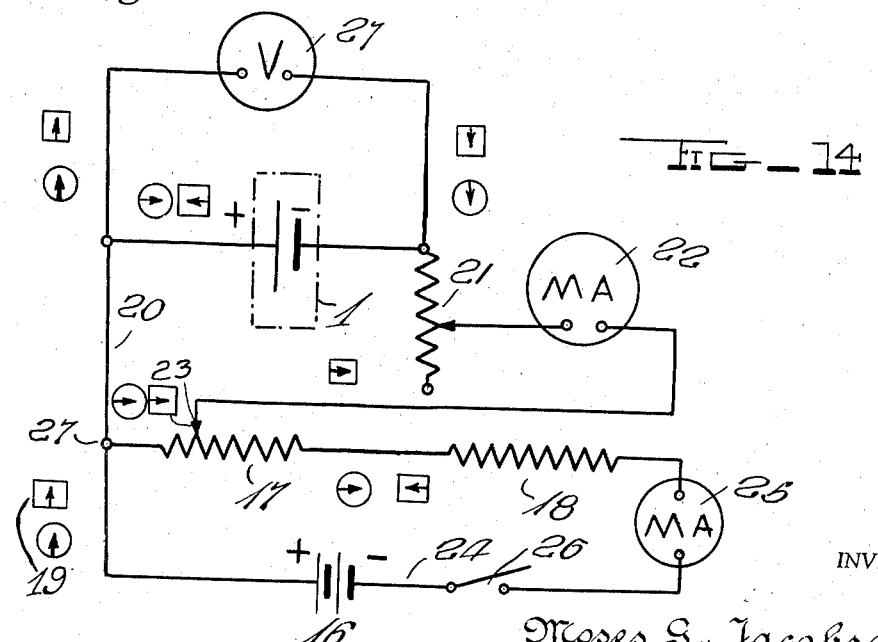
INVENTOR
Moses G. Jacobson,
BY
John B. Brady
ATTORNEY

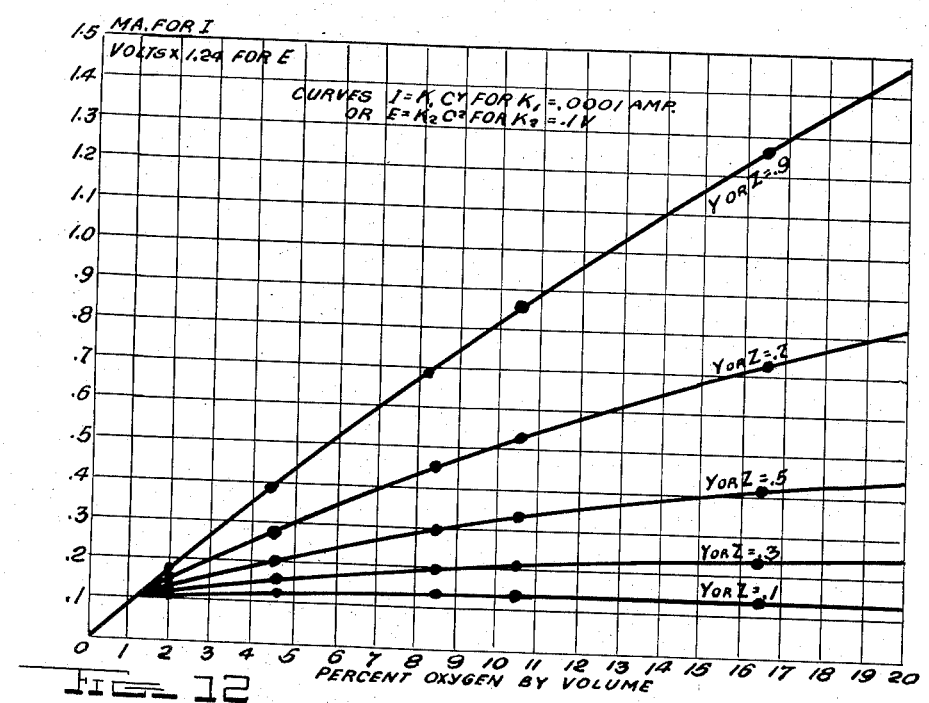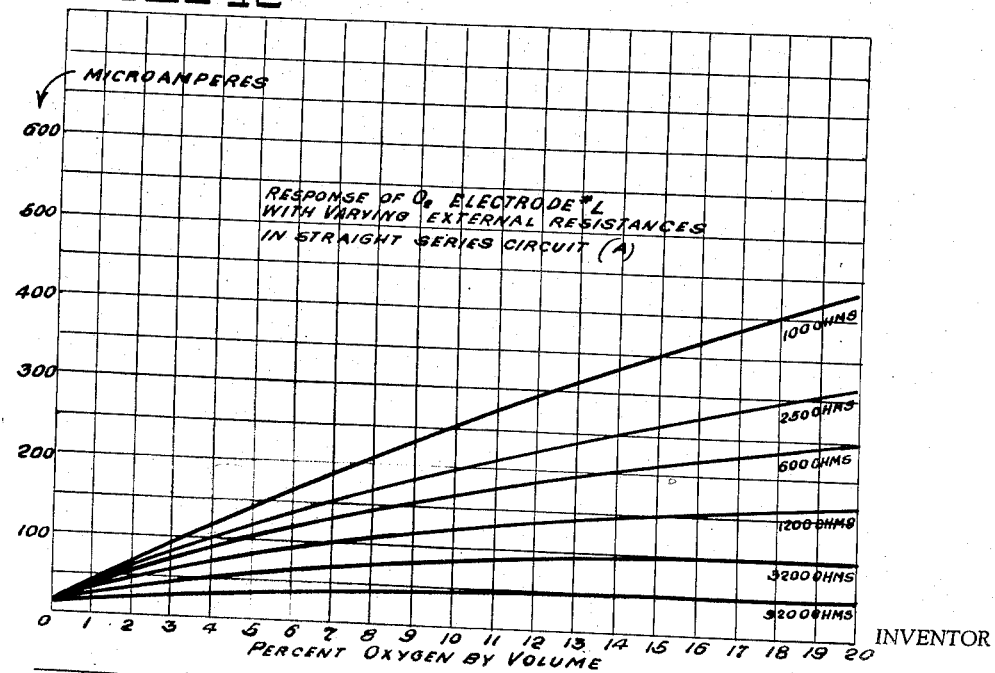

2,861,926

ELECTROCHEMICAL METHOD AND APPARATUS FOR GAS DETECTION

Moses G. Jacobson, Penn Township, Allegheny County, Pa., assignor to Mine Safety Appliances Co., Pittsburgh, Pa., a corporation of Pennsylvania Application February 26, 1953, Serial No. 338,939

10 Claims. (Cl. 204—1)

This invention pertains to a method using depolarization of a cathode in a galvanic or voltaic cell by oxygen or other oxidizing gases. Letters Patent 2,464,087 of March 8, 1949, for Method for Determining Oxygen in Gases, and 2,540,674, of February 6, 1951, for Apparatus for Determining Oxygen in Gases, have been issued previously to the applicant of this same general field of invention. The present invention is a result of further study of the basic electrochemical concepts involved, which has led to important improvements in characteristics of the electrodes and electrolyte as well as in the electric circuitry and the methods and procedures employed.

The principal general object of my invention is to simplify the operation and reduce the amount of maintenance work on devices using electrochemical methods of gas detection as well as to increase the accuracy of such methods.

Other objects of my invention are:

(1) To provide a method and apparatus, which will produce at will a desired functional relationship between the oxidizing gas concentration and an easily measurable electrical quantity, such as electric potential, current, resistance, power, etc., to suit any particular application.

(2) To provide a method whereby the above functional relationship can be made that of a straight line, or direct proportionality.

(3) To provide a method whereby the drift in the electric output of the detector cell can be reduced to a minimum, and thereby decrease the frequency of recalibration needed.

(4) To provide a method and apparatus to reduce the residual electric cell output at zero concentration of the oxidizing gas, and to provide an electric circuit, whereby the reading for zero gas can be made equal exactly to zero.

(5) To provide a method whereby, after a single calibration test on only one known gas concentration, a large number of unknown concentrations may be determined with great accuracy, without needing a recalibration for a long period of time.

Other objects of my invention are set forth in detail in the following specification by reference to the accompanying drawings, in which:

Fig. 1 is a vertical cross section through a detector cell;

Fig. 2 is a transverse sectional view on line 2—2 of Fig. 1;

Fig. 3 is a transverse sectional view on line 3—3 of Fig. 1;

Fig. 4 is a fragmentary vertical sectional view taken through the tubular carbon electrode and showing particularly the recesses or "windows" formed in the cylindrical wall of the electrode, the view being taken on line 4—4 of Fig. 5 where two pairs of recesses or windows are employed or on line 4'—4' of Fig. 6 where but two pairs of recesses or windows are involved;

Fig. 5 is a transverse sectional view taken on line 5—5 of Fig. 4;

Fig. 6 is a transverse sectional view through a modified form of carbon electrode which employs but two recesses or windows in lieu of the four recesses or windows illustrated in the arrangement shown in Fig. 5, the view being comparable to the section taken on line 5—5 of Fig. 4 except that two of the recesses or windows are omitted;

Fig. 7 is a transverse section through a further modified form of carbon electrode where but one recess or window is provided in the carbon electrode;

Figs. 8 and 9 are diagrams showing two basic circuits employed in tests described hereinafter in this specification;

Fig. 10 illustrates one of the improvements embodied in the circuit of my invention;

Fig. 11 is a schematic diagram showing the preferred circuit used in the method and apparatus of this invention;

Figs. 12 and 13 are curve diagrams illustrating some of the basic principles of the new methods of measurement, which constitute part of this invention;

Fig. 14 is an auxiliary circuit diagram, which is helpful in explaining the operation of some of the circuit improvements shown in Figs. 10 and 11.

Referring to the drawings, in detail, the cell is shown in Fig. 1 at 1, consisting of a container of insulation material such as "Lucite" of about 80 milliliters capacity, with a removable and replaceable top 2 of the same material screwed on to the top of container 1. Reference character 3 designates a zinc electrode attached to a stainless steel rod 4, whose upper threaded part 4a extends through the top 2 and is secured by nuts 4b. The carbon electrode consists of a rod 5 of the purest obtainable carbon of about ¼" diameter which has a bore 5a extending through the entire length thereof along its axis to a diameter of the order of ⅛6". For reasons set forth more fully in applicant's Patents 2,464,087 and 2,540,674, supra, the entire exposed surface of the carbon electrode, except for the surfaces of from one to four small areas 6 called windows, is covered with a baked-on insulating enamel designated at 5b; the "windows" 6 are recesses machined in the carbon electrode 5 so as to leave a section of carbon about .040" thick. The windows 6 are waterproofed and processed so that the electrolyte penetrates into the pores of the carbon only extremely slowly, while gaseous material can penetrate from the inside bore 5a to the outside surface of the windows 6 very readily.

It should be noted that while all considerations and improvements described hereinafter apply to any oxidizing gas such as oxygen, chlorine, $SO_2$, $CO_2$, NO, etc., I shall make reference hereinafter to oxygen not by way of limitation but by way of example only.

The diffusion rate of the gas sample through the carbon 5 is one of the main factors that determines the magnitude of the electric output from a given oxygen concentration. The penetration of the electrolyte into the carbon closes some of the passages for the gas; and even though this process is in the electrodes described herein very slow, it causes a slow downward drift (a day-to-day decrease) of the electric output. Certain electrical means to counteract this drift are among the subjects of this invention and will be described hereinafter.

On to the lower end of the carbon electrode 5, there is pressfitted a copper or brass collar 7 firmly cemented into a bushing 8 of insulation material preferably "Lucite." The collar 7 is provided with male threads to insure a secure connection with bushing 8. The bushing 8 fits snugly into an opening 9 at the bottom of the cell container 1 and screws into internal threads of a metal ring 10 molded into a rubber stopper 11. An insulated wire 12 soldered to the ring 10 is also molded into the rubber stopper 11 and serves to make electrical connection to the carbon electrode 5 through ring 10 and collar 7. A gasket 13 serves to make a leakproof connection between the surfaces of bushing 8 and the bottom of the cell 1.

The new cell has two distinctive features:

(1) The electrode 5 is made with either one, or two, or four windows of substantially equal size as shown in Figs. 7, 8 and 5, respectively; the four-window electrode is used for oxygen ranges of $O_2$ to 5% $O_2$ and less, the two-window electrode for the 0 to 10% $O_2$ range, and the one-window electrode for the 0 to 21% $O_2$ range. The current burden for all these ranges is set in the associated instruments at the same value, e. g., at 100 microamperes; it follows that at the end of each of these ranges, the current density is substantially in inverse proportion to the range; e. g., for the 10% range, the window area is twice and the current for 10% $O_2$ the same 100 ma. (microamperes) as for the 21% range; hence the current density is about one-half of that for 21%. But if 21% $O_2$ is admitted to the cell with the two-window electrode, the current will be twice as large, and therefore the current density at 21% is substantially the same for both of these electrodes and in general for all of them, as required by my former patents, supra.

By making the total window area inversely proportional to the range of oxygen concentration for which it is used, the advantage is gained of not having to deal with too small electric outputs at the lower concentrations, while still substantially maintaining the basic constancy of current density for any given oxygen concentration.

(2) The electrolyte is now a dilute solution (2 to 5%) of ammonium chloride acidified with HCl or $H_2SO_4$ to a pH of 3.0 at which point no development of $H_2$ at the zinc anode is yet observed; buffering materials may be added to keep the electrolyte solution longer at the desired acidity.

The advantages gained by this are that the sensitivity of the cell to acid components of the gas sample, such as $CO_2$, $SO_2$, etc., is very much decreased without substantially impairing the sensitivity to oxygen. In combination with suitable circuit design, which is the subject matter of a related application for patent, the influence of large concentrations of $CO_2$ can be entirely annihilated. I have also found that, by using this acid electrolyte, a much better zero, that is, much smaller residual currents with zero oxygen, are obtained than with the former electrolyte. This, as will be seen hereinafter, is of considerable importance for applications of the simplified methods of this invention.

When a cell substantially as described is connected through a constant resistance 14 to a current-measuring instrument 15 in the manner indicated on Fig. 8, an electric current is observed, which is a function of the oxygen concentration of the gas, that at the time is going through the bore of the carbon electrode. Applicant has established in his experiments that this electric current I varies with the oxygen concentration C, according to the formula:

$$I = I_0 + K_1 C^Y \quad (1)$$

where $I_0$ is the electric current obtained when the oxygen concentration is zero; $K_1$ is a constant, whose magnitude depends on the geometry and condition of both electrodes, on their spacing, on the conductivity of the electrolyte and on the external circuit resistance; the exponent Y depends only on the characteristics of the carbon electrode (that is, on the size and condition of the windows) and on the external circuit resistance. For a given set of cell and electrodes, both $K_1$ and Y are constant depending only on the external circuit resistance.

When the surface of the windows is very small and the electrodes are made of substantially pure carbon, or any other material that gives zero potential with zero oxygen as applicant's electrodes always are, and with the cell in a simple series resistance circuit, $I_0$ the electric current obtained with zero oxygen, which is sometimes called the residual current, is negligibly small. With other electrodes and electrolytes or with complex circuits, when $I_0$ is not negligible, the current-indicating meter can be adjusted to zero by the mechanical zero adjustment or by an auxiliary electrical circuit, or simply I may measure $I - I_0$, the excess of the current with oxygen present over the residual current I. In any case Formula 1 can be simplified to:

$$I = K_1 C^Y \quad (2)$$

To measure directly the E. M. F. (electromotive force) of any polarized galvanic cell is very difficult. However, the E. M. F. can be found by determining experimentally the internal resistance $R_{int}$ by any of the known methods (of which I have preferably used the method of Mance) and calculating the E. M. F.—E from the Ohm's law relationship:

$$E = I(R_{ext} + R_{int}) = V + IR_{int} \quad (3)$$

where $R_{ext}$ is the external circuit resistance and V the terminal voltage, which can be measured by a high-resistance voltmeter. When this was done by applicant, the relationship between E and the oxygen concentration C was found to follow an exponential formula of the same type as the electric current I, namely:

$$E = E_0 + K_2 C^Z \quad (4)$$

where $E_0$ is the residual E. M. F. for zero oxygen and $K_2$ and Z are parameters determined by factors similar to those that are effective for the parameters $K_1$, and Y in Formulae 1 and 2 above; both $K_2$ and Z are constant for any given combination of electrodes, electrolyte cell and external circuit resistance. For applicant's electrodes, when used in a simple series resistance circuit, $E_0$ is always small and the value of E may be expressed by:

$$E = K_2 C^Z \quad (5)$$

Inasmuch as the electric output of this detector cell in the absence of oxygen is practically zero and inasmuch as thermal effects are also too small to be observed, the electric energy produced by the cell is practically the one and only result of the chemical energy spent in reducing the part of the oxygen in the sample that reaches the electrode-electrolyte interface at the exterior surface of the windows. Therefore, with a gas sample passing through the electrode bore at constant pressure and constant flow, the assumption is justified that the electric power developed by the cell W is proportional to the oxygen concentration C, that is:

$$W = Kc \quad (6)$$

If the electric power at zero oxygen concentration is not negligible, the following equation may be substituted for 6:

$$W - W_0 = Kc \quad (7)$$

that is, the power increase due to $O_2$ concentration c is then proportional to C.

Theoretical considerations based on the thermodynamics of irreversible processes also lead applicant to this conclusion; however, simple as the ultimate results expressed in Formulae 6 and 7 are, its mathematical deduction is too extended to be presented in a patent application.

Since it is known that the electric power is expressed by $W = IE$, we have:

$$W = IE = Kc \quad (8)$$

We are able to test the correctness of this relationship by direct experiments, measuring the electric current I directly and the E. M. F.—E by way of the internal resistance $R_{int}$—for the same electrode, in the same cell, in a simple constant external resistance circuit but for varying oxygen concentrations.

A large number of experiments of this kind have fully confirmed the correctness of the above relationships 6, 7 and 8. Furthermore, multiplying with each other Equations 2 and 5 and comparing the result with 8, we have:

$$W = K_1 K_2 C^{Y+Z} = Kc \qquad (9)$$

and $$Y + Z = 1 \qquad (10)$$

Equation 10 follows directly from Equation 9 because of the well established algebraic axiom, that when two quantities whose variations are expressed by a power of the independent variable are equal for all values of the independent variable, the two powers of the variable must be equal. Since it was established by a large number of experiments that Equation 9 holds for all concentrations of oxygen, Equation 10 results from Equation 9.

The curves on Fig. 12 show experimental data confirming these formulae; when for a given electrode, cell and external resistance the current versus $O_2$ concentration was expressed by a formula in which $Y = .9$, the E. M. F. for the same cell, electrode and external resistance followed the relationship $E = K_2 C^{.1}$ ($Z = .1$). When by a change in resistance (or by other means, one of which is described below), the exponent in the current formula was changed from $Y = .9$ to $Y = .7$, exponent Z in the expression for E became equal to .3; for $Y = .5$, $Z = .5$, and so forth.

The following numerical example may serve to further illustrate prevailing conditions established by this invention. In a series of tests with one of the detector cells of this invention in the electric circuit as shown on Fig. 14, the electric currents measured by milliammeter 22 for oxygen concentrations of four test samples and atmospheric air were respectively 0.30; 0.44; 0.525; 0.725 and 0.84 milliampere. The potential differences at the terminals of the detector cell as measured by a vacuum tube voltmeter 27 with a 6 megohms input impedance were respectively: 97.5; 113; 117.5; 133.3 and 138.8 millivolts. To obtain the corresponding electromotive forces to each of these terminal voltage differences, the voltage drop $I \times R_{int}$ inside of the detector cell was added; the internal resistance values $R_{int}$ for the cell at these concentrations was found by other independent tests (by the method of Mance and others) to be respectively 115, 105, 100, 92, and 80 ohms). The internal voltage drops $I \times R_{int}$ for the above five oxygen concentrations thus are 34.5; 46.2; 52.5; 66.7 and 67.2 millivolts. Adding these values to the observed terminal voltages, the following values are obtained for the respective electromotive forces 132; 159; 170; 190 and 206 millivolts.

From the above we learn:

(1) All points for the electric current follow very closely to a formula $I = KC^{0.7}$ (current proportional to oxygen concentration to the 0.7 power).

(2) After the constant K is evaluated to equal 0.1 milliampere or .0001 ampere, all the data are very well represented by the second from the top curve on Fig. 12.

(3) The values for the E. M. F.'s fit well an expression of the type $K_2 C^Z$; and Z for the above example is found to be equal to 0.3.

(4) When all E. M. F. values are multiplied by a scale factor of 1.24 volts—the data are very closely represented by the second curve from the bottom in Fig. 12.

If the total power W developed by the detector cell for every oxygen concentration is now calculated by multiplying each electric current value by the corresponding E. M. F. there is obtained, respectively: 39.6; 70.0; 90.3; 137.8 and 173.0, microwatts. Taking the wattage for 20.8% as the standard, these wattages are proportional to 4.75; 8.42; 10.87; 16.57; and 20.8 which is very close to the concentrations of the four test samples as determined by chemical analysis, namely: 4.80; 8.40; 10.75; 16.5 and 20.8% for air.

Numerous tests similar to the foregoing example, but conducted with various detector cells, various electrodes and with various resistance parameters, and under many varied conditions, have confirmed that (1) both electric currents and E. M. F.'s always follow formulae of the type of (2), and (4) or (5); (2) the exponent Z is always a complement to 1 of the exponent Y, making $Y + Z$ always equal to 1; and (3) the total power output of the cell $W = I \times E$ is always closely proportional to the oxygen concentrations.

The practical consequences from the foregoing, with respect to methods of measuring oxygen concentrations, are as follows:

(1) According to Equations 6 and 8, there is proportionality or a straight-line relationship between electrical power output and $O_2$ concentrations; however, the power measurement must include also the electric power developed inside of the cell; to measure the total electric power output, E (the E. M. F.) must be known, and as stated above, to measure it directly is very difficult, and even to determine it indirectly by way of measurement of the internal resistance of the cell is feasible only in laboratory experiments, and not in an industrial instrument. However, in cases when the external circuit resistance is made very large relative to the cell resistance (e. g., 5000 ohms or more external resistance with 100–200 ohm cell resistance) and an accuracy of the order of 2% is sufficient, the internal resistance may be neglected and the terminal voltage V, which is readily measured, may be substituted for E. In these cases the equation: $IV = Kc$ (11) is used to calculate $O_2$ concentration after the coefficient K is determined from one measurement of I and V on a known oxygen concentration. A direct indicating wattmeter or an electronic wattmeter may be also used in such cases.

However, working these cells with high resistances of the order of several thousand ohms, besides the difficulty of finding portable electrical meters sufficiently sensitive for such application, introduces a very considerable increase in the response time—from a matter of 2–5 seconds with low resistances to several minutes. I have overcome this by a special electric circuit which will be described hereinafter.

(2) According to the foregoing theory, while it is not possible to obtain exact proportionality between the current output from the detector cell and the oxygen concentration, it is possible to approach it by making the exponent Y in Equation 2 as close to 1 as possible; I have found that it is feasible to have $Y = .9$ and obtain as close an approach to proportionality as shown on the upper curve of Fig. 12. From the foregoing it follows that for E then the exponent Z must be equal to .1; in other words, E must change with concentration very slowly, as shown on the lowest curve of Fig. 12. In order to obtain these conditions with the straight series resistance circuit of Fig. 8, the external circuit resistance $R_{ext}$ with the improved electrode 5 must be of the order of 100 ohms. But with this external resistance, the polarization, the electric current and consequently the polarization of both electrodes is very high, and the drift (decay of electric output with time) is quite rapid.

In order to avoid these difficulties, I have replaced in the preferred embodiment the simple series resistance circuit shown on Fig. 8 or Fig. 9 by the circuit of Fig. 14 in which there are added to the circuit of Fig. 8 or Fig. 9 a dry battery 16 with resistances 17 and 18, one or both of which are adjustable, in series; part of resistance 17 is also connected in the circuit of detector cell 1 and thus is common to both circuits. The essence of the improved circuit is illustrated in Fig. 10. This materially differs from the elemental circuits of Figs. 8 and 9, for in Fig. 8 resistor 14 was arranged in series with the detector cell 1 and meter 15, while in Fig. 9 resistor 14 was arranged in series with detector cell 1, and meter 15 shunted with respect thereto. In Fig. 10 the dry cell battery 16 has been added which connects across the circuit, including resistor 14 and the resistor 44 in series. An adjustable tap 45 operates on resistor 14 through resistor 46 which is in series with detector cell 1 and meter 15; thus the part of adjustable resistor 14 from the left end to tap 45 is in common to both the circuits of the oxygen cell 1 and the dry cell battery 16.

With respect to polarity, connections are made in the way shown on Fig. 14 so that wire 19 coming from the positive terminal of dry cell battery 16 is connected to wire 20 coming from the positive terminal of detector cell 1. With this connection in circuit 20—1 and 21—22 constituted by the detector cell, the adjustable resistance 21 and the measuring instrument 22, the currents originating respectively from the detector cell 1 and the current from the dry cell battery 16 oppose each other, while in the common part of resistance 17 they add together. Resistance 17 is so chosen that even at its highest value the effective value of this part of the circuit is small relative to both resistance 18 and resistance 21.

Thus any change in the setting of the adjustable slide 23 on resistance 17 produces only negligible changes in the total effective resistance in the circuit of dry cell battery 16. In addition, the current in the circuit of dry cell battery 16 is at least one order of magnitude larger than the current in the circuit of the detector cell 1.

Thus the current injected into the circuit of detector cell 1 from the circuit 24—18 of the dry cell battery 16 is small with respect to the current in the circuit 24—18 of the dry cell battery 16, yet comparable in magnitude to the current originated by the detector cell 1; and being in the opposite direction reduces it further to a very small value, less than 100 microamperes, which is 10% to 50% of the original value. This very small current is so small with respect to the current in the circuit 24—18 of the dry cell battery 16 that any changes in it are unable to change conditions in the dry cell circuit 24—18 more than by 1–2%, and thus the electric power injected from the dry cells circuit 24—18 into the measuring (detector) circuit remains substantially constant during any changes in oxygen concentration within the selected range.

Prevailing actual conditions will be clarified by the following numerical example: resistance 18 may be 50 ohms, resistance 17 may be 10 ohms, resistance 21 may be 250 ohms; the current in the circuit 24 containing dry cell battery 16, resistances 17 and 18, which registers on meter 25, is about 50 milliamperes; the current in circuit 20 containing detector cell 1, resistance 21 and meter 22, with switch 26 open, is .6 ma. With switch 26 closed, the current in circuit 20, including detector cell 1, resistance 21 and meter 22, is adjusted by adjusting slide 23 to a position in which the current of 100 microamperes is measured when air, 20.8% $O_2$ or the top concentration of the oxygen range, is going through the detector cell 1. High resistance voltmeter 27 attached to the terminals of detector cell 1 reads .15 volt when switch 26 is open. When switch 26 is closed, the voltmeter reads .55 volt. Now when various concentrations of $O_2$ lower than 20.8% (or the top of the range) are admitted, the current goes down until with no oxygen present it is close to zero. The voltage goes down too but only to .40 volt at zero oxygen which is the voltage supplied from resistance 17 of the dry cell circuit 24. It will be seen that with the circuit characteristics as described the electrical energy injected from the dry cell circuit 24 into the measuring circuit 20 remains substantially constant for all changes produced by the varying oxygen concentration, and therefore the electrical current observed in the measuring circuit is substantially due only to the reduction of oxygen at the detector electrode 5, and therefore is closely proportional to the reduction of oxygen. Referring to Formulae 2, 4 and 5, the electric current in this example was found to follow the expression:

$$I = K_1 C^Y = .0065\, C^{.9} \text{ milliamps}$$

or $$6.5 \times C^{.9} \text{ microamperes}$$

where C is expressed in volume percent of oxygen, while E is expressed by the formula:

$$E = .4 + K_2 C^{.1} = .11\, C^{.1} \text{ volts}$$

To obtain the same rate of variation of current and E. M. F. (same Y and Z) with a straight resistance circuit (as, for instance, accomplished by opening switch 26 of the dry cell circuit), resistance 21 had to be changed to 30 ohms, making the total external circuit resistance, including the meter 22, equal to 80 ohms, and the current through the detector cell 1 was increased more than 12 times.

Thus it will be seen that this circuit arrangement permits a close approach to straight-line calibration without increasing the current through the detector cell 1 and thus keeping the wear on the electrodes and electrolyte to a minimum.

In addition, it is found that the time of response is very much improved with the circuit using an auxiliary dry cell battery 16. In the foregoing numerical example, the time of response was not the one obtained with over 300 ohms external circuit resistance in the straight resistance circuit, but close to the response time with 100 ohms total external resistance. A probable explanation of this unexpected result is the fact that, in spite of the small electric current, the total energy acting in the detector cell 1 due to the increased voltage is not much lower.

This last feature, the decrease of the response time, is also very useful in applying the electric power measuring method described hereinbefore; with the several thousand ohms external circuit resistance used in this method, to be able to neglect the internal detector cell resistance and substitute terminal voltage for E. M. F. measurement, the time response of several minutes can be brought down to below one minute by using the circuit with the auxiliary dry cell battery 16, of course, with the resistance values suitably changed.

The concept of proportionality between the oxygen concentration and the electric power developed by the detector cell has led to another improved method of oxygen determination: electric power being always equal to the product of the current and the E. M. F., it follows that if one of these factors is maintained constant, that is, at every oxygen concentration change, the circuit resistance or the amount of electric energy injected from an auxiliary source is adjusted in such a way that one of the two factors (I or E) of the power product is always brought back to a constant predetermined value, then the other factor must be directly proportional to the oxygen concentration. This has been confirmed by a great many tests, both by keeping E (or terminal voltage V in case of large external resistances, relative to internal cell resistance) constant and measuring the current I, and vice versa, by keeping I constant and measuring E or V.

Electric power, as follows from Ohm's law, is also equal to $I^2R$ or $E^2/R$ where R is the total resistance of the circuit ($R = R_{ext} + R_{int}$). Hence this measurement can also be carried out by keeping either I or E one of the non-linear power factors constant, determining the circuit resistance needed to keep I or E respectively constant for each $O_2$ concentration, and finding the corresponding $O_2$ concentration from the direct proportionality $C = KR$ in case I is kept constant, and the inverse proportionality $C = K/R$ in case E is kept constant. As before, if the internal cell resistance is small relative to the external resistance, the terminal voltage V can be substituted for the E. M. F.—E. I have found that when using V for E, when the external resistance of the detector cell is 10% of the total circuit resistance, the $O_2$ determination is in error not more than 5%; when the internal resistance is 4% of the total resistance, the $O_2$ determination is off by less than 2%, and so forth.

I or E of the detector cell 1 can be kept constant also by using a circuit similar to the one shown on Fig. 14. In this case the response time with the same high external circuit resistances is smaller, as explained hereinbefore, and also, in general, smaller resistance values can be used than in the straight series resistance circuit.

Finally by using in the circuit of Fig. 14 an additional meter 25 inserted as shown in the dry cell circuit 24 or alternatively between junction 27 and potentiometer 17, in the part that is common to both circuits, this method can be practiced in another manner: by manipulating the slider 23 on potentiometer 17 and adjusting variable resistor 21, both I and V (and hence also E) produced by the detector cell 1 are kept constant when the $O_2$ concentration is varied, and the change in current in the dry cell circuit 20 is measured and found to be proportional to the oxygen concentration. By making resistance 18 much higher than resistance 17 (of the order of several hundred ohms), a high degree of accuracy can be obtained because then the E. M. F. of the dry cell 1 will be entirely unaffected by any changes in the setting of resistances 17 and 21 made in order to keep the E. M. F. as well as the current in the detector cell 1 constant, when the oxygen concentration is varied; hence, the current change in the dry cell circuit 24 represents the only change caused by the change in oxygen concentration, and therefore these quantities are proportional to each other. Experiments have shown that a very high degree of accuracy can be obtained by this method, mainly because with both the current and terminal voltage of the detector cell constant, the internal resistance of it is also constant, and the current change in the dry cell circuit therefore is truly the one and only energy change in the entire system produced by the change in oxygen concentration.

The various methods of oxygen determination described hereinbefore have specific advantages and disadvantages, depending on the range of oxygen concentrations which is to be covered by the measurements: that is, when $O_2$ is to be measured only in the range between 21 and 10%, as for instance where avoidance of $O_2$ deficiency is the object, the straight variable resistance circuit, with keeping the current I constant and measuring the change in terminal voltage or external resistance, will be sufficiently accurate and being the simplest method will probably be preferred in most of such applications. On the other hand, when a wide range, e. g., from 0 to 25% $O_2$ is to be covered, the last-described method of measuring the current change in auxiliary circuit will be the most preferable, since the other method would require unconveniently high variable resistances. From the foregoing descriptions, it will be easy for those skilled in the art of electrical circuitry to choose in each case the most advantageous of the described methods.

The several methods described, while having considerable differences in their details, are, however, all based on certain common concepts.

In Fig. 11 a circuit diagram of a complete instrument for continuous indication of $O_2$ in ranges of 0–1, 0–5, 0–10 and 0–25% is shown. It will be seen that basically the same circuit as illustrated in Fig. 14 is used with the following additions:

Variable resistor 28 is connected across the dry cell battery 16 which serves to vary the drift in the output from this dry cell battery until its effect on the measuring circuit equals that of the effect from the drift in the detector cell 1; the currents from these two sources going through detector cell 1 and through meter 22 are opposite in direction, as shown by the two arrows, the encircled arrow 29 representing the current originating from the dry cell battery 16 and the arrow in the square box 30 designating the current originating from the $O_2$ detector cell 1; and therefore when the two drifts are equal they cancel each other out. The resistor circuit 17—18 is also provided with an intermediate adjustable resistor shown at 43.

One of the four window electrodes when used in a circuit such as shown in Fig. 14, which does not have the adjustable resistor or potentiometer 28 of Fig. 11, gave a decrease of current output from 100 microamperes to 80 microamperes for the first day of running on 1% of $O_2$; then, after being readjusted every day to 100 microamperes, the indication for 1% oxygen for a number of days drifted from 100 to 90 microamperes each day. After insertion of an adjustable 100 ohms rheostat directly across the #2 Burgess flashlight cells used in this case for battery 16, with the slider set midway (that is putting about 50 ohms across the dry cells) the drift was decreased to 5% (100 to 95 microamperes) for the first day of a new electrode similar in every respect to the first one, and to 1 to 3% for the following days. To make this possible, the absolute value of the current drift in the dry cell loop of the circuit must be substantially the same as that in the detector loop. For example, if the detector cell itself, through the resistances as shown, in the absence of cells 16 changes its current output from 2 milliamperes in a days running on air, and the dry cells 16 themselves with 50 ohms in parallel and the detector cell open circuited produces a current drifting from 1.9 milliamperes to 1.702, the net indication of the complete instrument changes only from 100 microamperes to 98 which is 2% of the indication.

The rate of drift in the dry cell part of the network is 11.1% as against 10% in the detector part, that is slightly higher than in the detector part. If the rate of drift of 16 is further increased by decreasing 28, complete neutralization of drift is obtained, and if 28 is still further decreased—updrift in place of downdrift is obtained.

No two cells even of the same make and lot have exactly the same drift characteristics. However, by gradually and slowly increasing or decreasing the "in" part of the variable resistor 28, it is not difficult to adjust the net drift in the $O_2$ indication to values below 5% per day with any dry cell and with a little care even to lower values.

Another addition is the zero adjusting circuit: the residual current or current with zero oxygen in the detector cell 1 is generally very small after the electrolyte is freed from dissolved oxygen. The electrolyte supplied to users of this instrument when made commercially is deprived of oxygen to a very low content by a special process. However, in filling of the cell from the container, sometimes oxygen from the air is absorbed again; also in handling of the electrodes occasionally some impurities adhere to the active window surface. To enable the user in such cases not to wait a long time for the electrode and electrolyte to be gradually cleaned by the slow process of electrolytic self-cleaning, there is added the zero adjusting circuit 31, 32, 33, etc., to 40 shown on the right side of the meter 22 in Fig. 11. The circuit consists of a source of D. C. power, for instance, a dry cell 32 feeding the resistance bridge circuit 33, 34, 35 and 36. By means of potentiometer rheostats 33 and 35, any desired degree of unbalance can be created in the bridge circuit 31, and thereby a small voltage derived from it, which by way of conductors 37 and 38 and through a high resistor 39 is applied to points on opposite sides of meter 22. Thus a very small current from this source, marked by an arrow surrounded by a triangle designated at 40, is applied through the meter 22 in a direction opposite to the current from the detector cell 1. Due to the high value of resistance 39, of the order of 5000 ohms, and the much lower resistance of the meter 22 and its associated resistors 41 and 42 which are shunting the zero circuit, the backwards transfer of electric energy from the measuring circuit to the zeroing circuit is negligible.

In carrying out this method, preferred for practical applications in the field, the electric current I developed by the varying oxygen content in gas mixtures is measured. By this method, as follows from the foregoing theoretical discussion, an exact straight-line calibration cannot be obtained, as by the methods in which E or I are kept constant; but on the other hand, the test procedure is simplified to such extent that it can be easily carried out by unskilled production line personnel. In comparison with the methods, where for the measurement of E the simpler measurement of V is substituted, the preferred method has the advantage that it is not subject to the limitation of the range of measurable concentrations and to the slower response time, which is an unavoidable, intrinsic characteristic of the V measuring procedures in consequence of the necessary high external circuit resistance as explained above.

Though exact straight-line calibration cannot be achieved in this preferred method; but with circuit components similar to those in the example hereinbefore referred to, it can be approached to the extent of a curve expressed by the formula $I = K_1 C^{.9}$ where $Y = .9$ (see upper curve of Fig. 12).

The following result of my preferred circuit and method which is not apparent upon first consideration should be noted: the feature of keeping the current density for a given $O_2$ concentration constant at all times, in combination with the experimental expression for the current obtained and having or making the cell current equal zero for zero oxygen, leads to the result that the curvature of the response curve expressing current versus $O_2$ concentration is the same for all ranges: that is, the electric current read on the meter for 1% $O_2$ will be the same in the 0-5% $O_2$ range as for 5% in the 0 to 25% range (both being ⅕ of the top of the range), provided in both cases the meter is always set to the top of its scale for the top of the oxygen concentration range. As a consequence the advantage over the former status of the art emerges that with the present method and circuit it is no longer necessary to calibrate on at least two known oxygen concentrations, but a calibration on only one known oxygen concentration is sufficient which must not necessarily be at the end of the range but can be at any point within the range. This greatly simplifies the operation without any sacrifice in accuracy.

What I claim as new and desire to secure by Letters Patent of the United States is as follows:

1. In a system for the electrochemical detection of gas utilizing a polarized electric cell, wherein one of the electrodes is adapted to be depolarized by a gas to be detected, the method which consists in measuring the total change in electric power output of the cell produced by changing from one known gas concentration to another known gas concentration, replacing the known gases by the gas to be tested, measuring the difference in total electric power output between the gas to be tested and one of the known gas concentrations for determining the unknown concentration of the gas tested from the proportionality between changes of power and changes of concentration.

2. In a system for the electrochemical detection of gas utilizing a polarized electric cell including a pair of electrodes, wherein one of the electrodes is adapted to be depolarized by a gas to be tested and wherein the half cell electromotive force of said electrode is equal to zero in the absence of said gas, the method which consists in admitting a known concentration of the gas to be detected to the electrode that is adapted to be depolarized, measuring the electric power produced by the cell, admitting the gas mixture containing the gas whose concentration is to be determined to the same polarized electrode, measuring the electric power produced by the cell across the electrodes thereof and determining the unknown gas concentration from the proportionality between electric power output and the concentration.

3. In a system for the electrochemical detection of gas utilizing a polarized electric cell including a pair of electrodes, wherein one of the electrodes is adapted to be depolarized by a gas to be tested and wherein the half cell electromotive force of said electrode is equal to zero in the absence of said gas, the method which consists in admitting a known concentration of the gas to be detected to the depolarizable electrode of the cell, measuring both the electric current and electromotive force produced by the cell, admitting the gas mixture that contains the gas whose concentration is to be determined to the depolarizable electrode, measuring the electric current and electromotive force produced and determining the unknown concentration from the proportionality of concentration to the product of the electric current and electromotive force.

4. In a system for the electrochemical detection of gas utilizing a polarized electric cell including a pair of electrodes, wherein one of the two electrodes is adapted to be depolarized by a gas to be tested and wherein the half cell electromotive force of said electrode is equal to zero in the absence of said gas, the method which consists in connecting the cell in a circuit composed of electric current measuring device and a resistance in series with each other, connecting a voltage measuring device across the terminals of the cell, all these components having resistances high enough to make the effective external resistance of the entire circuit large in comparison with the internal resistance of the cell, admitting a known concentration of the gas to be detected, measuring the electric current and terminal voltage at this concentration, admitting a gas mixture containing the gas to be tested as a component, measuring the electric current and terminal voltage and determining the unknown concentration of the gas tested from the proportionality relationship between the product of current and terminal voltage and the test gas concentration.

5. In a system for the electrochemical detection of gas utilizing a polarized electric cell including a pair of electrodes, wherein one of the two electrodes is adapted to be depolarized by a gas to be tested and wherein the half cell electromotive force of said electrode is zero in the absence of said gas, the method which consists in connecting the cell in an electric circuit containing devices for measuring electric currents and electromotive forces, means for measurably varying the electric resistance, admitting to the depolarizable electrode of the cell a known concentration of the gas to be determined, measuring both the electric current and electromotive force of said cell, admitting to the cell gas mixtures containing unknown concentrations of the gas to be determined, returning each time one of the electric quantities which enters as a non-linear factor into the electric power to the same value that it had in the presence of the known gas concentration, measuring changed value of one of the electric quantities that is not being returned to a constant value and deducing the unknown concentration from its proportionality to the said changed electric quantity.

6. An electrochemical method of gas detection, wherein one of two electrodes of a polarized cell is adapted to be depolarized by a gas to be tested and wherein the half cell electromotive force of said electrode is zero in the absence of said gas comprising: connecting said cell in an electric circuit whose effective resistance is large relative to the internal resistance of said cell, said circuit containing a device for measuring electric currents, a device for measuring voltages and means for varying the electric current through said cell, admitting to said polarizable electrode a known concentration of the gas to be determined, observing both the electric current through the cell and the voltage across its terminals, admitting gas mixtures containing the gas to be determined in unknown concentration, returning the electric current through the cell every time to the same value, that it had when the known concentration was admitted, then reading the corresponding terminal voltage and deducing the unknown concentration from the proportionality between it and the terminal voltage at constant current.

7. In a system for the electrochemical detection of gas utilizing a polarized electric cell including a pair of electrodes, wherein one of the two electrodes is adapted to be depolarized by a gas to be tested and wherein the half cell electromotive force of said electrode is zero in the absence of said gas, the method which consists in connecting the cell in an electric circuit whose effective resistance is large relative to the internal resistance of the cell, said circuit containing a device for measuring the electric currents, a device for measuring voltages, and means for varying the electric current through the cell, admitting to the depolarizable electrode of the cell a known concentration of the gas to be determined, measuring both the electric current through the cell and the voltage across its terminals, admitting gas mixtures containing the gas to be determined in unknown concentration, returning the electric current through the cell each time to the same value that it had when the known concentration was admitted, observing the corresponding terminal voltage and determining the unknown concentration from the proportionality between it and the terminal voltage at constant current.

8. A system of electrochemical gas detection comprising in combination a detector element consisting of a primary electrochemical cell containing a cathode and an anode, said cathode having a more positive potential than said anode, and said cathode being polarized by current generated by said detector cell itself without the aid of external polarizing current, and means for substantially decreasing said polarizing current while simultaneously increasing terminal voltage, said means comprising: an auxiliary source of electric power, a voltage divider circuit connected to said source of power having a part which provides a fractional voltage, the said part of said voltage divider circuit having a resistance that is small in comparison both with the total resistance of the detector cell circuit and with the total resistance of the voltage divider circuit whereby a fraction of the terminal voltage of said auxiliary source smaller than any utilized potential derived from said detector cell is made available, and circuit connections from the positive side of the part of said voltage divider circuit producing said fractional voltage to the cathode of the detector cell and from the negative side of said part of said voltage divider circuit producing said fractional voltage through an electric current measuring device to the anode of the detector cell.

9. A system of electrochemical gas detection according to claim 8 wherein said fractional voltage is adjustable up to a limit smaller than any utilized potential derived from said detector cell.

10. In an instrument for determination of the concentration of an oxidizing gas in a gas mixture: a polarized primary cell having positive and negative electrodes, and wherein the gas being tested acts as a depolarizing element, a first electric circuit including an electric meter and a plurality of resistors connected in a series path and connected between the positive and negative electrodes of said cell, a second electric circuit including an independent source of direct current power having connected thereto a number of resistors in series with each other at least one of which is adjustable, and an adjustable resistance in shunt with the entirety of said series connected resistors, the positive side of said independent source of direct current power being connected with the positive electrode of said cell, a movable tap on one of the resistors in said series connected resistors, said tap being connected to one end of the first electric circuit for variably including a selected portion of the said last mentioned resistor in the series path forming said first electric circuit for subtracting the electric currents from said cell and from said independent source of direct current power in all parts of said first and second electric circuit except in the selected portion of said last mentioned resistor where the two currents are added to each other, the effective value of the resistance of said portion of said last mentioned resistor being lower than the effective resistance of either the first or the second of said electric circuits, and a third electric circuit containing a separate independent source of direct current power, an electric network comprising a series circuit containing series connected resistances and a resistive path connected in shunt with said last mentioned series circuit, an adjustable tap on said last mentioned resistive path leading to one side of the electric meter in said first electric circuit adjacent the positive electrode of said cell and an adjustable tap on one of the resistances in said last mentioned series circuit, said trap being connected with the first mentioned series path adjacent the negative terminal of said cell for applying a small and adjustable part of the voltage of the separate independent source of power to said electric meter in such direction as to decrease the indicated reading thereof.

References Cited in the file of this patent
UNITED STATES PATENTS

| | | |
|---|---|---|
| 2,069,562 | Schnorf | Feb. 2, 1937 |
| 2,370,871 | Marks | Mar. 6, 1945 |
| 2,382,735 | Marks | Aug. 14, 1945 |
| 2,383,450 | Coleman | Aug. 28, 1945 |
| 2,464,087 | Jacobson | Mar. 8, 1949 |
| 2,540,674 | Jacobson | Feb. 6, 1951 |
| 2,583,276 | Patnode | Jan. 22, 1952 |
| 2,585,060 | Wallace | Feb. 12, 1952 |